A. B. ELY.
Telegraph-Wire Insulator.
No. 53,427.  Patented March 27, 1866.
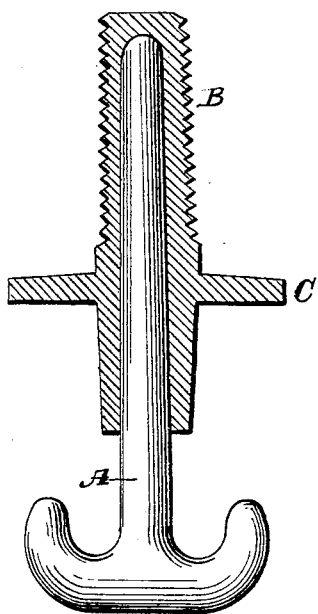
Witnesses:
W. M. Parker.
J. E. Zarwell.
Inventor:
A. B. Ely

UNITED STATES PATENT OFFICE.

A. B. ELY, OF NEWTON, MASSACHUSETTS.

IMPROVEMENT IN TELEGRAPH-INSULATORS.

Specification forming part of Letters Patent No. 53,427, dated March 27, 1866.

*To all whom it may concern:*

Be it known that I, A. B. ELY, of Newton, in the State of Massachusetts, have invented, as a new article of manufacture, an Improved Pin-Hook for Supporting Telegraphic Wires; and the following is an exact description thereof.

Iron pin-hooks with rubber screw-covered shanks, and also with a hollow rubber cone attached, have been in use heretofore. My pin-hook with its attachment is made by fitting tightly to the rubber shank a disk of rubber projecting essentially at a right angle from the shank above the hook. Hard rubber is the best material to be used.

The drawing is a sectional view, A being the hard-rubber-covered pin-hook, and B the disk of hard rubber, (or vulcanized), which is to be firmly and tightly attached to or made a part of the rubber shank of the hook, and to project out horizontally, or essentially so, over the hook.

What I claim as an article of manufacture is—

The rubber screw-covered pin-hook with rubber disk attached, as described.

A. B. ELY.

Witnesses:
W. M. PARKER,
J. E. FARWELL.